(12) United States Patent
Kunz et al.

(10) Patent No.: US 8,950,826 B2
(45) Date of Patent: Feb. 10, 2015

(54) BRAKE SYSTEM FOR A VEHICLE AND METHOD FOR OPERATING A BRAKE SYSTEM OF A VEHICLE

(75) Inventors: Michael Kunz, Steinheim An der Murr (DE); Stefan Strengert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 256 days.

(21) Appl. No.: 13/580,881

(22) PCT Filed: Jan. 11, 2011

(86) PCT No.: PCT/EP2011/050247
§ 371 (c)(1),
(2), (4) Date: Nov. 6, 2012

(87) PCT Pub. No.: WO2011/104046
PCT Pub. Date: Sep. 1, 2011

(65) Prior Publication Data
US 2013/0049450 A1 Feb. 28, 2013

(30) Foreign Application Priority Data
Feb. 24, 2010 (DE) .......................... 10 2010 002 280

(51) Int. Cl.
*B60T 13/74* (2006.01)
*B60T 8/48* (2006.01)
*B60T 8/26* (2006.01)
*B60T 8/34* (2006.01)

(52) U.S. Cl.
CPC ............... *B60T 8/4872* (2013.01); *B60T 8/267* (2013.01); *B60T 8/348* (2013.01)
USPC ............................................. 303/10; 303/186

(58) Field of Classification Search
USPC ........... 303/3, 10, 113.1–113.5, 116.2, 116.4, 303/186
See application file for complete search history.

(56) References Cited

U.S. PATENT DOCUMENTS

| 4,395,883 A | 8/1983 | Melinat |
| 6,349,995 B1 | 2/2002 | Itoh et al. |
| 7,059,691 B2 * | 6/2006 | Tsunehara et al. ............ 303/152 |
| 2002/0158510 A1 | 10/2002 | Kobayashi et al. |
| 2011/0108375 A1 * | 5/2011 | Wuerth et al. ............. 188/106 P |
| 2013/0057052 A1 * | 3/2013 | Kunz et al. ........................ 303/3 |
| 2013/0062931 A1 * | 3/2013 | Kunz et al. ........................ 303/3 |

FOREIGN PATENT DOCUMENTS

| CN | 101011963 | 8/2007 |
| DE | 33 45 694 | 6/1985 |

(Continued)

*Primary Examiner* — Christopher Schwartz
(74) *Attorney, Agent, or Firm* — Kenyon & Kenyon LLP

(57) ABSTRACT

A brake system and a method for operating same for a vehicle having a first wheel brake cylinder, into which a first brake medium volume is displaceable from a master brake cylinder, a second wheel brake cylinder, into which a second brake medium volume is displaceable from the master brake cylinder, a first pump associated with the first wheel brake cylinder and a second pump associated with the second wheel brake cylinder, the brake system including a block valve coupled to the brake medium reservoir, the first pump being able to pump a third brake medium volume through the at least partially open block valve and a first non-return valve into the first wheel brake cylinder, and the second pump being able to pump a fourth brake medium volume through an at least partially open block valve and the second non-return valve into the second wheel brake cylinder.

12 Claims, 2 Drawing Sheets

(56) References Cited

FOREIGN PATENT DOCUMENTS

| | | |
|---|---|---|
| DE | 36 24 344 | 1/1988 |
| DE | 40 09 640 | 6/1991 |
| DE | 40 29 793 | 3/1992 |
| DE | 42 13 740 | 10/1993 |
| DE | 195 34 451 | 3/1997 |
| DE | 198 25 278 | 12/1999 |
| DE | 10 2004 044599 | 4/2005 |
| DE | 10 2005 061543 | 7/2007 |
| DE | 10 2006 046935 | 4/2008 |
| DE | 10 2008 002345 | 12/2009 |
| EP | 1 470 979 | 10/2004 |
| JP | 61-232954 | 10/1986 |
| JP | 62-173364 | 7/1987 |
| JP | 7-502469 | 3/1995 |
| JP | 2000-354302 | 12/2000 |
| JP | 2005-170287 | 6/2005 |
| JP | 2005-199744 | 7/2005 |
| JP | 2007-2710372 | 8/2007 |
| WO | WO 89/01890 | 3/1989 |
| WO | WO 93/11009 | 6/1993 |
| WO | WO 94/25322 | 11/1994 |
| WO | WO 2008/058985 | 5/2008 |
| WO | WO 2009/089944 | 7/2009 |
| WO | 2009/149977 | 12/2009 |
| WO | WO 2009/149977 | 12/2009 |

* cited by examiner

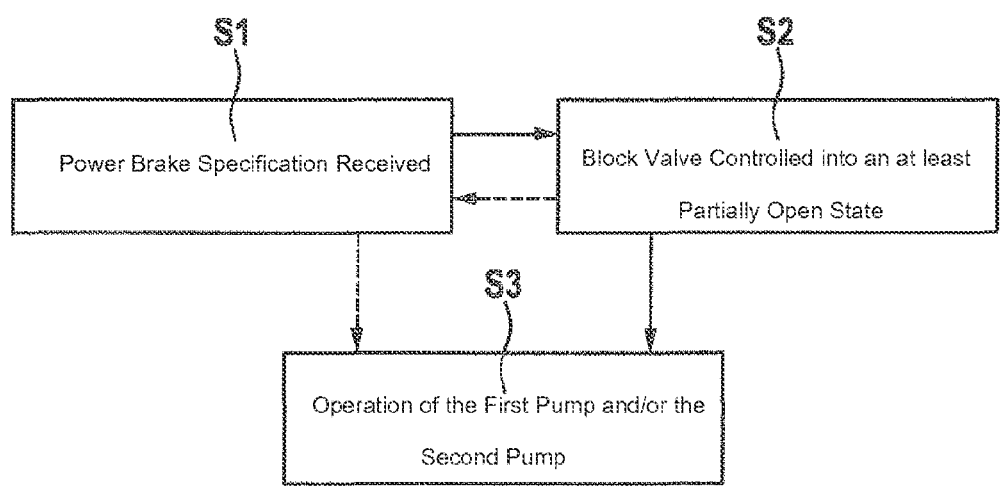

BRAKE SYSTEM FOR A VEHICLE AND METHOD FOR OPERATING A BRAKE SYSTEM OF A VEHICLE

FIELD OF THE INVENTION

The present invention relates to a brake system for a vehicle. Furthermore, the present invention relates to a method for operating a brake system of a vehicle.

BACKGROUND INFORMATION

Electric and hybrid vehicles have a brake system configured for recuperative braking including an electric motor operated as a generator during recuperative braking. Following an intermediate storage, the electrical energy recovered during recuperative braking may be used for accelerating the vehicle. This makes it possible to reduce power loss, which a conventional vehicle incurs when braking frequently in travel, energy consumption and pollutant emission of the electric or hybrid vehicle.

However, operating the electric motor, for example the electric drive motor, in generator mode typically requires a certain minimum speed of the vehicle. A recuperative brake system is thus frequently unable to exert a regenerative braking torque on the wheels of the vehicle for as long as it takes for the moving vehicle to come a standstill. For this reason, a hybrid vehicle often has, in addition to the recuperatively operated electric motor, also a hydraulic brake system, which makes it possible, at least in a low speed range, to compensate for the lack of braking action of the recuperative brake. In this case it is possible to apply the entire braking torque via the hydraulic brake system even when the electrical energy store is full, which is when the recuperative brake usually exerts no braking torque on the wheels.

On the other hand, in some situations, it is desirable to exert the lowest possible hydraulic braking force on the wheels in order to achieve a high degree of recuperation. For example, following shifting operations, the decoupled generator is often activated as a recuperative brake in order to ensure reliable charging of the intermediate store and high energy savings.

Generally, a driver may prefer a total braking torque of his vehicle, which corresponds to his actuation of a brake input element such as his brake pedal actuation, for example, irrespective of an activation or deactivation of the recuperative brake. For this reason, some electric and hybrid vehicles have an automatic system, which is supposed to adapt the braking torque of the hydraulic brake system to the current braking torque of the recuperative brake in such a way that a desired total braking torque is maintained. The driver thus does not have to take on the task of the delay regulator himself, by adapting the braking torque of the hydraulic brake systems via an appropriate actuation of the brake input element to the current braking torque of the recuperative brake. Examples for such an automatic system are brake-by-wire brake systems, in particular EHE systems. Due to their complex electronics, mechanics and hydraulics, however, brake-by-wire brake systems are relatively expensive.

As an alternative to brake-by-wire brake systems, DE 10 2008 002 345 A1 discusses a brake system, which includes a first brake circuit decoupled from a master brake cylinder and connected to a brake medium reservoir. This first brake circuit has a wheel axle assigned to it, onto which a recuperative braking torque of an electric motor operated as a generator may be applied. Two additional brake circuits are coupled to the master brake cylinder in such a way that the driver is able to brake into them directly and thus exert a direct hydraulic braking torque onto the wheels associated with the two additional brake circuits.

SUMMARY OF THE INVENTION

The exemplary embodiments and/or exemplary methods of the present invention provide a brake system for a vehicle having the features described herein and a method for operating a brake system of a vehicle having the features described herein.

One advantage of the brake system described here is the small number of required electrically controllable valves. A controllable valve may be understood as a valve, which is switchable via an electrical control signal/switching signal at least into an open and into a closed state. This reduces the costs, in particular for an electronics of the brake system, which is suitable for controlling all required electrically controllable/switchable valves.

The exemplary embodiments and/or exemplary methods of the present invention are intended to provide in particular for two brake circuits, each of which is assignable to one wheel of a vehicle, it being possible to omit the provision of a main switching valve (high-pressure switching valve) for each of the two brake circuits. Instead, the function of the two omitted main switching valves (high-pressure switching valves) may be performed via the block valve, which is coupled to the brake medium reservoir. The block valve thus replaces the two omitted main switching valves.

Omitting the two main switching valves by providing the block valves makes it possible to reduce the total number of valves required by the brake system that are switchable/controllable by an electrical switching signal/control signal at least into an open state and into a closed state. This reduces the manufacturing costs for the brake system. Additionally, as is explained in more detailed below, in the case of a reduced number of electrically switchable/controllable valves, it is possible to use more cost-effective control electronics that are also simpler to manufacture.

Thus, the brake system according to the exemplary embodiments and/or exemplary methods of the present invention may be equipped with at least one additional brake circuit, the total number of required/used controllable valves remaining low compared to a conventional design. This makes it possible to extend the brake system described below readily in such a way that it has at least one more brake circuit in addition to the brake circuits associated with the first wheel brake cylinder and the second wheel brake cylinder.

This additional brake circuit may be decoupled from the master brake cylinder. In this case, the at least one additional brake circuit that is decoupled from the master brake cylinder may be used in a simple manner for an active buildup of a hydraulic braking torque in the at least one additional wheel brake cylinder associated with the additional brake circuit.

For example, in this case, the hydraulic braking torque in the at least one additional wheel brake cylinder may be set in such a way that a generator braking torque that varies over time is able to be masked. This creates the possibility of ascertaining with the aid of a sensor and/or by estimation the total braking torque desired by the driver and/or by an automatic control system of the vehicle, and the current recuperative braking torque exerted by the recuperative brake. By additionally taking into account the hydraulic braking torques exerted by the first wheel brake cylinder and the second wheel brake cylinder is possible to ascertain the difference between the exerted braking torques and the desired total braking torque. An hydraulic braking torque corresponding to the ascertained difference may subsequently be actively exerted via the additional brake circuit.

This allows for a generator braking torque to be masked, without the driver having to expend additional work. No expensive electronics are required for performing the method steps described in the above paragraph. A sufficient recuperation efficiency is thus ensured at tenable costs when applying the present invention. The exemplary embodiments and/or exemplary methods of the present invention is intended to provide an easy-to-operate and cost-effective alternative to a conventional brake-by-wire brake system, which is very advantageous in particular for rear-wheel-drive or all-wheel-drive vehicles. However, the exemplary embodiments and/or exemplary methods of the present invention may also be used for the front-wheel drive featuring a by-wire front axle. A masking process is ensured in this instance, which has no effects on the braking distance.

However, the exemplary embodiments and/or exemplary methods of the present invention are not limited to an application in an electric or hybrid vehicle. For example, a transversal acceleration-dependent brake-force distribution may also be implemented by the present invention. In the case of a transversal acceleration-dependent brake-force distribution, the brake force at some of the wheels of the vehicle, which may be at the two rear-axle wheels, is apportioned in accordance with a vertical force that occurs when traveling around a curve. In this manner, the frictional coefficient of the wheels, most notably the frictional coefficient of the two rear wheels, is adapted to the transversal acceleration. This permits a more stable braking of the vehicle in curves. To ascertain the hydraulic braking torque that is to be set actively via the first brake circuit, a transversal acceleration ascertained by a sensor device may be used.

In addition, the exemplary embodiments and/or exemplary methods of the present invention may be used for dynamic braking in curves. In the case of dynamic curve braking, the braking force at a wheel on the inside of the curve is increased relative to the braking force at a wheel on the outside of the curve. This achieves a more dynamic handling performance.

In addition, the exemplary embodiments and/or exemplary methods of the present invention may also be used for a more advantageous braking when driving in reverse. In particular, by increasing the braking force at the rear axle, a better brake-force distribution is set for driving in reverse. In this context, one also speaks of a reverse brake-force distribution. Most notably, this permits a substantially more stable braking performance in the case of a slow reverse travel on a downgrade.

At the same time, the exemplary embodiments and/or exemplary methods of the present invention may provide for improving the feeling on the pedal by decoupling the additional brake circuit from the master brake cylinder such that the driver no longer has to control the additional brake circuit directly via a force exerted on the brake pedal. The pedal travel may also be shortened in this manner.

It is pointed out, however, that applicability of the brake system according to the present invention is not limited to an additional equipment of another brake circuit in accordance with the previous paragraphs. The above specific embodiments pertaining to the additional brake circuit are to be understood merely in exemplary fashion.

The exemplary embodiments and/or exemplary methods of the present invention may provide for a brake system that is usable in a vehicle having an X brake circuit configuration. Thus, in contrast to conventional brake systems, the brake system according to the present invention may be equipped with an axle that is decoupled from the master brake cylinder and is not limited to a use in vehicles having an axle-wise brake circuit configuration.

It must be noted that the brake medium reservoir is not to be understood as the master brake cylinder. Instead, the brake medium reservoir may be understood as a brake medium volume or a brake medium container, the internal pressure of which is settable irrespective of an internal pressure of the master brake cylinder or corresponds to a definitively specified pressure such as atmospheric pressure, for example.

The two non-return valves and their orientation make it possible to ensure that an undesired brake medium exchange between the two brake circuits associated with the first and the second wheel brake cylinder is prevented. This ensures at the same time that, if desired, an additional brake medium volume may be pumped by the first pump and/or the second pump via the at least partially open block valve into the associated first and/or second wheel brake cylinder. Thus, it is possible to generate advantageously a wheel-individual power brake pressure, i.e. a brake pressure that is not attributable to an exertion of force on the master brake cylinder, in the first or the second wheel brake cylinder.

For example, the first non-return valve may be oriented in such a way that a brake medium displacement from the first pump to the block valve is prevented by the first non-return valve and/or the second non-return valve is oriented in such a way that a brake medium displacement from the second pump to the block valve is prevented by the second non-return valve. In this manner, an undesired brake medium exchange between the subunits of the brake system interacting with the first wheel brake cylinder and the second wheel brake cylinder is reliably prevented.

In one advantageous specific embodiment of the brake system, a first storage chamber of the brake system may be hydraulically connected to the first wheel brake cylinder in such a way that a fifth brake medium volume is displaceable from the first wheel brake cylinder into the first storage chamber and/or a second storage chamber of the brake system may be hydraulically connected to the second wheel brake cylinder in such a way that a sixth brake medium volume is displaceable from the second wheel brake cylinder into the second storage chamber. This allows for a quick reduction of a first hydraulic braking torque built up by the first wheel brake cylinder and/or of a second hydraulic braking torque built up by the second wheel brake cylinder by displacing the fifth brake medium volume and/or the sixth brake medium volume into the respective storage chamber.

A first switchover valve may be situated between the master brake cylinder and the first wheel brake cylinder in such a way that the first brake medium volume is displaceable from the master brake cylinder through the at least partially open first switchover valve into the first wheel brake cylinder. Furthermore, a brake medium displacement from the first switchover valve to the first wheel brake cylinder and/or from a delivery side of the first pump to the first wheel brake cylinder may be controllable using a first wheel inlet valve of the brake system. Likewise, a brake medium displacement from a corresponding second switchover valve to the second wheel brake cylinder and/or from a delivery side of the second pump to the second wheel brake cylinder may be controllable using a second wheel inlet valve of the brake system. Thus, a desired first hydraulic braking torque and/or a second hydraulic braking torque by be set reliably using the brake system described here.

Advantageously, a brake medium displacement from the first wheel brake cylinder to an induction side of the first pump and/or from the first wheel brake cylinder to the first storage chamber is controllable using a first wheel outlet valve of the brake system. Advantageously, a brake medium displacement from the second wheel brake cylinder to an induction side of the second pump and/or from the second wheel brake cylinder to the second storage chamber is controllable using a second wheel outlet valve of the brake system. This improves the precision when setting the first hydraulic braking torque and/or the second hydraulic braking torque.

In one further development, the brake system may additionally include: a third pump coupled to the brake medium reservoir, at least one third wheel brake cylinder, which is hydraulically connected to the third pump in such a way that a seventh brake medium volume may be pumped from the brake medium reservoir into the third wheel brake cylinder by the third pump, and a continuously adjustable valve, which is hydraulically connected to the brake medium reservoir and at least the thirds wheel brake cylinder in such a way that an eighth brake medium volume is displaceable through the at least partially open continuously adjustable valve from the third wheel brake cylinder into the brake medium reservoir. Thus, the brake system described in the paragraphs above is expandable by an additional brake circuit having the third pump, the continuously adjustable valve and the at least one third wheel brake cylinder. Since this additional brake circuit is decoupled from the master brake cylinder, a third hydraulic braking torque exertable by the third wheel brake cylinder may be set actively via an actuation of the third pump. A preferred total braking torque and/or an advantageous braking torque configuration may be implemented on the wheels of a vehicle by actively setting the third hydraulic braking torque.

As a supplement, the additional brake circuit may also be equipped with a fourth wheel brake cylinder. Thus, even the fourth hydraulic braking torque provided by the fourth wheel brake cylinder may be actively built up in accordance with a preferred value.

In particular, the brake system may comprise a generator, by which a generator braking torque is exertable at least on a wheel associated with the third wheel brake cylinder. Since the third hydraulic braking torque of the third wheel brake cylinder may be actively built up, the generator braking torque varying over time may be advantageously masked by providing the third hydraulic braking torque.

Furthermore, the first pump, the second pump and/or the third pump may be situated on a common shaft of a motor. This reduces the required number of motors.

The brake system may in particular have exactly twelve controllable valves, which are controllable at least into an open state and into a closed state via an electrical signal provided by a control device of the brake system. The limitation of the valves required by the brake system, which are electrically switchable at least into the open state and into the closed state, to the number of twelve reduces the requirements and/or the costs for an electronics suited as a control device.

In another advantageous specific embodiment, the control device of the brake system may be configured to receive a power brake specification provided by a vehicle component, and, after receiving the power brake specification, control the block valve into an at least partially open state and to control the first pump and/or the second pump by taking into account the power brake specification in such a way that the third brake medium volume may be pumped from the brake medium reservoir via the at least partially open block valve into the first wheel brake cylinder and/or the fourth brake medium volume may be pumped from the brake medium reservoir via the at least partially open block valve into the second wheel brake cylinder. The power brake specification implementable by the control device may be a specification of an automatic speed control device and/or vehicle safety system for an automatic braking of the vehicle after ascertaining a traffic situation that requires such action. Using the brake system described here, it is thus possible to perform, in addition to the driver braking directly into the first wheel brake cylinder and/or second wheel brake cylinder, also a power brake operation, which requires not exertion of force on the master brake cylinder.

The advantages described in the paragraphs above are also ensured for a vehicle having a corresponding braking system.

The advantages described above are also realizable using a corresponding method for operating a brake system of a vehicle.

Additional features and advantages of the exemplary embodiments and/or exemplary methods of the present invention are explained below with reference to the figures.

BRIEF DESCRIPTION OF THE DRAWINGS

FIG. 2 shows a flow chart of one specific embodiment of the method.

DETAILED DESCRIPTION

Figure 1:
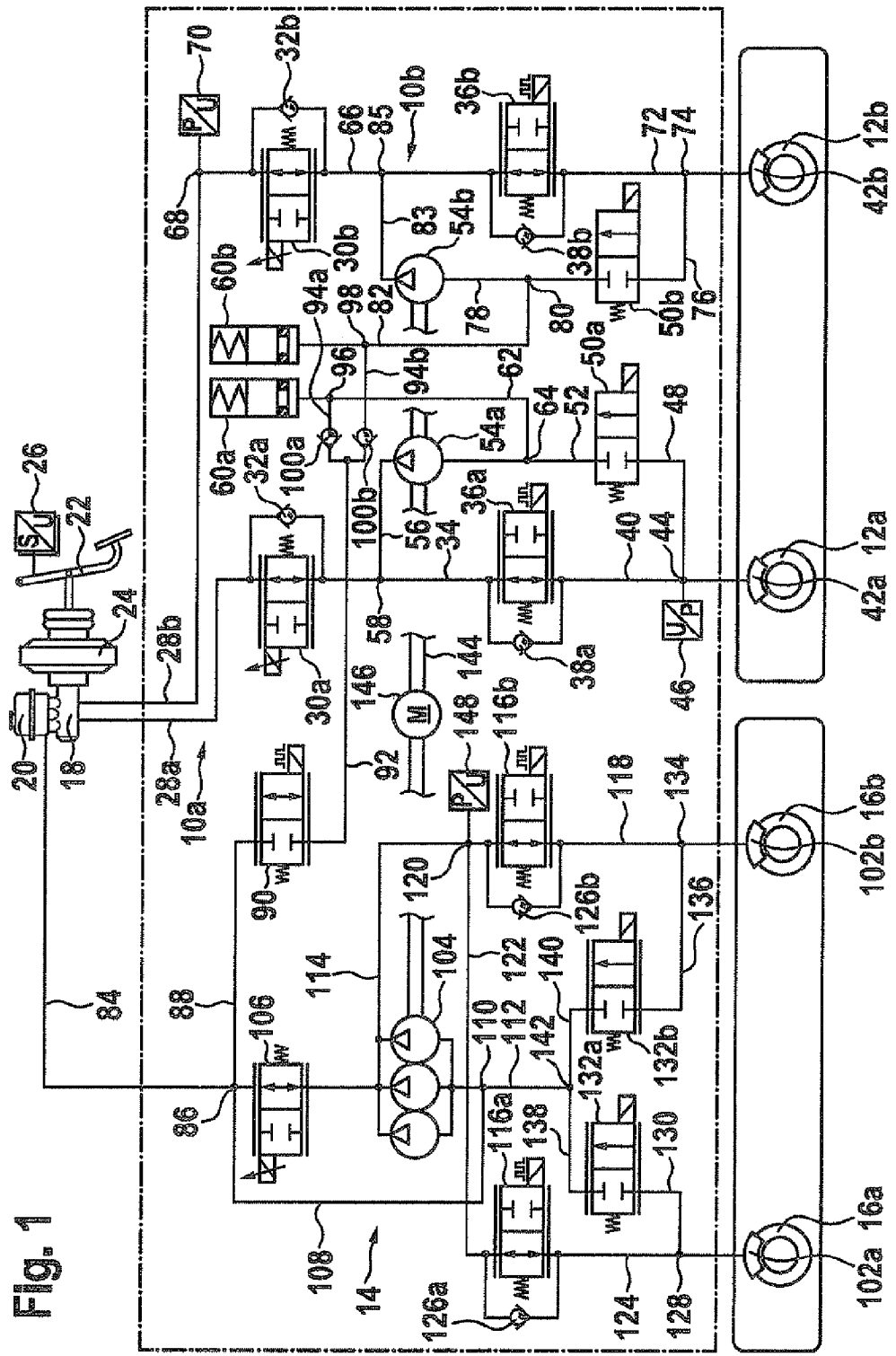
FIG. 1 shows a circuit diagram of a specific embodiment of the brake system.

FIG. 1 shows a circuit diagram of a specific embodiment of the brake system. The brake system shown schematically in FIG. 1 is usable not only in an electric or hybrid vehicle. Instead, the brake system may also be used in a vehicle, for example, to ensure a preferred brake force distribution on the wheels of the vehicle when braking during cornering and/or driving in reverse. The indications, described below, of the use of the brake system in an electric or hybrid vehicle are to be understood merely by way of example.

The brake system comprises a first brake circuit 10a for braking a first wheel 12a, a second brake circuit 12b for braking a second wheel 12b and a third brake circuit 14 for braking a third wheel 16a and a fourth wheel 16b. Equipping the brake system with third brake circuit 14 is optional, however. First wheel 12a and second wheel 12b may be situated on a common axle of a vehicle, for example on the rear axle. The applicability of the brake system, however, is not limited to an axle-wise arrangement of first wheel 12a and second wheel 12b. As an alternative to an axle-wise arrangement, wheels 12a and 12b may also be arranged on one side of the associated vehicle or diagonally on the vehicle.

It should be noted that the illustrated brake system is not limited to the fixed number of four wheels 12a, 12b, 16a and 16b. Instead, the brake system may be expanded in such a way that a greater number of wheels are brakable. In particular, the brake system may in this case have at least two brake circuits that correspond to third brake circuit 14.

The brake system has a master brake cylinder 18 and a brake medium reservoir 20. A brake medium exchange bore such as a snifting bore, for example, may be developed between master brake cylinder 18 and brake medium reservoir 20. Master brake cylinder 18 and brake medium reservoir 20, however, may also be developed without a hydraulic connection.

A brake input element 22 such as a brake pedal may be coupled to master brake cylinder 18. As an alternative or a supplement to a brake pedal, a differently developed brake input element 22 may also be used. Using brake input element 22, a driver of a vehicle equipped with the brake system is able to effect a pressure increase in an internal volume of master brake cylinder 18. A brake booster 24 may be coupled to the master brake cylinder in such a way that the pressure increase effected by the driver in the interior volume of master brake cylinder 18 may be augmented by brake booster 24. Brake booster 24 may be a hydraulic brake booster and/or an electromechanical brake booster (i-booster), for example. Brake booster 24 may be a regulatable/controllable brake booster.

As a supplement, a sensor 26 may also be situated on brake input element 22 in such a way that an actuation of brake input element 22 by the driver is detectable by sensor 26. Sensor 26 may be configured to supply a braking force and/or braking distance signal, corresponding to the actuation of the brake pedal, to an evaluation electronics (not shown). A possibility for using the information provided by sensor 26 will be explained in more detail below. Sensor 26 may be, for example, a pedal-travel sensor, a booster diaphragm-travel sensor and/or a rod-travel sensor. However, the practicability of sensor 26 is not limited to the examples enumerated here.

A first supply line 28a of first brake circuit 10a and a second supply line 28b of second brake circuit 10b are coupled to master brake cylinder 18. First supply line 28a connects a first switchover valve 30a to master brake cylinder 18. A bypass line having a non-return valve 32a runs in parallel to first switchover valve 30a. First switchover valve 30a is connected to a first wheel inlet valve 36a via a line 34. The non-return valve 32a situated in parallel to first switchover valve 30a is oriented so as to prevent a brake medium displacement through the bypass line in a direction from line 34 to first supply line 28a. A bypass line having a non-return valve 38a is also developed in parallel to first wheel inlet valve 36a. Non-return valve 38a is oriented so as to prevent a displacement of brake medium through the bypass line from line 34 to line 40, which is likewise coupled to first wheel inlet valve 36a.

Line 40 connects first wheel inlet valve 36a to a first wheel brake cylinder 42a, by which a first hydraulic braking torque is able to be produced for braking first wheel 12a. Optionally, it is also possible for a pressure sensor 46 to be coupled to line 40 via a junction point 44. A pressure in the interior of first brake circuit 10a may be ascertained using pressure sensor 46. A line 48 may also open out into junction point 44, via which line 48 a first wheel outlet valve 50a is connected to the first wheel brake cylinder. A line 52 leads from first wheel outlet valve 50a to an intake side of a first pump 54a. A line 56 runs from a delivery side of first pump 54a and opens out into junction point 58 situated in line 34. First brake circuit 10a has also a first storage chamber 60a, which is connected via a line 62 to a junction point 64 situated in line 52.

Second brake circuit 10b may be developed corresponding to first brake circuit 10a. It should be noted, however, that the brake system described here is not limited to an analogous development of first brake circuit 10a and second brake circuit 10b. The subsequent description of brake circuit 10b is to be interpreted merely by way of example.

Second supply line 28b, for example, leads from master brake cylinder 18 to a second switchover valve 30b having a bypass line oriented in parallel, which is equipped with a non-return valve 32b. Via a line 66, second switchover valve 30b may be connected to a second wheel inlet valve 36b having a bypass line running in parallel, which has a non-return valve 38b. Regarding the orientation of non-return valves 32b and 38b, reference is made to the description of first brake circuit 10a. Optionally, another pressure sensor 70 for determining a pressure in second brake circuit 10b may be coupled to second supply line 28b via a junction point 68.

A second wheel brake cylinder 42b of second brake circuit 10b is connected to second wheel inlet valve 36b via a line 72. From a junction point 74 in line 72, a line 76 runs to a second wheel outlet valve 50b. Second wheel outlet valve 50b is connected to an intake side of a second pump 54b via a line 78. A line 82, at end of which a second storage chamber 60b of second brake circuit 10b is situated, also opens out into line 78 via a junction point 80. A line 83 runs from a delivery side of second pump 54b to a junction point 85 situated in line 66.

First wheel brake cylinder 42a is thus hydraulically connected to master brake cylinder 18 in such a way that a first brake medium volume is displaceable from master brake cylinder 18 through the at least partially open first switchover valve 30a and the at least partially open first wheel inlet valve 36a into first wheel brake cylinder 42a. Accordingly, a second brake medium volume is displaceable from master brake cylinder 18 through the at least partially open second switchover valve 30b and the at least partially open second wheel inlet valve 36b into second wheel brake cylinder 42b. The driver thus has the option of braking wheels 12a and 12b by braking directly into brake circuits 10a and 10b.

First brake circuit 10a and second brake circuit 10b are also connected to brake medium reservoir 20 by bypassing master brake cylinder 18. For example, from brake medium reservoir 20, an intake line 84 may run to a junction point 86, to which a line 88 is connected that leads to a block valve 90. Block valve 90 is associated jointly with first brake circuit 10a and second brake circuit 10b. As a possible specific embodiment, a line 92 leading away from block valve 90 may divide into a first connecting line 94a and a second connecting line 94b. First connecting line 94a may open out into a junction point 96 within line 62, which connects first storage chamber 60a with first wheel outlet valve 50a and first pump 54a. Accordingly, second connecting line 94b may open out into a junction point 98 within line 82, which connects second storage chamber 60b with second wheel outlet valve 50b and second pump 54.

Respectively one non-return valve 100a and 100b is situated in first connecting line 94a and second connecting line 94b. The non-return valve 100a situated in first connecting line 94a is oriented so as to prevent a brake medium flow through first connecting line 94a in a direction from line 62 to line 92. Accordingly, on account of the orientation of non-return valve 100b of second connecting line 94b, a brake medium flow is prevented through second connecting line 94b in a direction from line 82 to line 92. Each non-return valve 100a and 100b is thus oriented so as to prevent a brake medium displacement from storage chamber 60a or 60b, wheel outlet valves 50a or 50b and intake sides 54a or 54b, or respectively of the brake circuit volumes between components 50a, 54a and 60a or 50b, 54b and 60b to block valve 90. In particular, due to the opposite orientation of non-return valves 100a and 100b, a medium flow is prevented from the partial volume of first brake circuit 10a between components 50a, 54a and 60a and the partial volume of second brake circuit 10b between components 50b, 54b and 60b.

In the event of a necessary ABS control intervention in wheel brake cylinder 42a or 42b, the associated outlet valve 50a or 50b is opened. Subsequently, a volume is able to flow only into the associated storage chamber 60a or 60b of the respective brake circuit 10a or 10b. Using a pump 54a or 54b, this volume is able to be returned only to the associated brake circuit 10a or 10b. In this manner, the volume balance of first brake circuit 10a and second brake circuit 10b is kept stable even in the event of an ABS control intervention.

It should be noted once again that the two non-return valves 100a and 100b ensure that a brake medium volume that was discharged via a wheel outlet valve 50a or 50b is returned only to the associated brake circuit 10a or 10b. This secures the volume balance of each individual brake circuit 10a and 10b. Nevertheless, there exists the possibility, in the event of a desired active pressure buildup, decoupled from, or taking into account an actuation of brake input element 22, of delivering an additional volume via block valve 90 from brake medium reservoir 20 individually into one of the two brake circuits 10a or 10b or simultaneously into both brake circuits 10a and 10b.

First switchover valve 30a, second switchover valve 30b, first wheel inlet valve 36a and second wheel inlet valve 36b may be developed as valves that are open when no current is applied. In this case it is advantageous if first wheel outlet valve 50a and second wheel inlet valve 50b are configured as valves that are closed when no current is applied. Block valve 90 may be developed as a valve that is closed when no current is applied. This ensures a reliable decoupling of first brake circuit 10a and second brake circuit 10b from brake medium reservoir 20 when block valve 90 is not in operation (has no current applied to it).

Below, the interaction of the individual components for braking first wheel 10a and second wheel 10b is described:

By actuating brake input element 22, the driver is able to effect a braking action directly into brake circuits 10a and 10b for braking wheels 12a and 12b via a pressure increase in the interior volume of master brake cylinder 18. For this purpose, a first and a second brake medium volume are displaceable into wheel brake cylinders 42a and 42b in accordance with the force applied by the driver and/or by brake booster 24. Additionally, using first pump 54a, a third brake medium volume is able to be pumped from brake medium reservoir 20 through the at least partially open block valve 90, non-return valve 100a and the at least partially open first wheel inlet valve 36a into first wheel brake cylinder 42a. Accordingly, by actuating second pump 54b, a fourth brake medium volume is able to be pumped from brake medium reservoir 20 through the at least partially open block valve 90, non-return valve 100b and the at least partially open second wheel inlet valve 36b into second wheel brake cylinder 42b. Thus it is possible to perform a power braking action on wheels 12a and 12b even independently of an actuation of brake input element 22 on the part of the driver or by taking into account the actuation of brake input element 22.

In order to supply brake medium from brake medium reservoir 20 into first brake circuit 10a and/or second brake circuit 10b, or for a respective return of brake medium into brake medium reservoir 20, only block valve 90 needs to be activated. An additional valve is not required for this purpose. In particular, cost-effective block valve 90 may be used in order to eliminate respectively a separate main switching valve (high-pressure valve) of first brake circuit 10a and second brake circuit 10b. The multifunctionality of first brake circuit 10a and of second brake circuit 10b is thus ensured in spite of a comparatively low total number of valves 30a, 30b, 36a, 36b, 50a, 50b and 90, which are controllable/switchable at least into an open state and into a closed state using an electrical control signal/switching signal.

In spite of the joint coupling of first brake circuit 10a and second brake circuit 10b to brake medium reservoir 20 via block valve 90, an undesired brake medium displacement between first brake circuit 10a and second brake circuit 10b is prevented due to the opposite orientation of non-return valves 100a and 100b. Using cost-effective non-return valves 100a and 100b thus makes it possible to omit an electrically controllable/switchable valve.

For a quick reduction of the first hydraulic braking torque and/or the second hydraulic braking torque, a fifth brake medium volume may be displaced from first wheel brake cylinder 42a into first storage chamber 60a and/or a sixth brake medium volume may be displaced from second wheel brake cylinder 42b into second storage chamber 60b. It is thus possible to reduce a no longer desired vehicle deceleration quickly and in a targeted manner. In this instance, the opposite orientation of non-return valves 100a and 100b also prevents an undesired brake medium displacement between first brake circuit 10a and second brake circuit 10b.

Third brake circuit 14 is also coupled to brake medium reservoir 20 via intake line 84. Third brake circuit 14 thus does not have the conventional hydraulic connection to master brake cylinder 18. Thus an internal pressure may be actively set/built up in a third wheel brake cylinder 102a associated with third wheel 16a and in a fourth wheel brake cylinder 102b associated with fourth wheel 16b of third brake circuit 14 in accordance with a preferred third hydraulic braking torque and a corresponding fourth hydraulic braking torque.

A specific embodiment of third brake circuit 14 is described below, which is to be understood, however, merely by way of example for the brake system disclosed herein:

Third brake circuit 14 may have a third pump 104 and a continuously adjustable/controllable valve 106. Continuously adjustable valve 106 (continuously regulatable valve) is connected to brake medium reservoir 20 via intake line 84. From junction point 86, a line 108 leads to a junction point 110 of a line 112, which opens out on an intake side of third pump 104. From a delivery side of third pump 104, a line 114 runs to a fourth wheel inlet valve 116b, which is connected to fourth wheel brake cylinder 102b via a line 118. From a junction point 120 in line 114, another line 122 runs to a third wheel inlet valve 116a. Third wheel inlet valve 116a is connected to third wheel brake cylinder 102a via a line 124. Respectively one bypass line having a non-return valve 126a and 126b runs in parallel to third wheel inlet valve 116a and fourth wheel inlet valve 116b. Non-return valves 126a and 126b are respectively oriented so as to prevent a brake medium displacement from third pump 104 to associated wheel brake cylinder 102a or 102b via the bypass lines.

A third wheel outlet valve 132a is connected to third wheel brake cylinder 102a via a junction point 128 in line 124 and a line 130. Likewise, a fourth wheel outlet valve 132b is connected to fourth wheel brake cylinder 102b via a junction point 134 in line 118 and a line 136. Respectively one line 138 and 140 runs from third wheel outlet valve 132a and fourth wheel outlet valve 132b, which lines 138 and 140 open out into a junction point 142 on an end of line 112 opposite from third pump 104.

Continuously adjustable valve 106 may be compared to a switchover valve in terms of its function and specification. Continuously adjustable valve 106 may also be called a PCR valve (pressure control valve). Using continuously adjustable valve 106 and third pump 104 allows for a pressure setting in third brake circuit 14 that is independent of the driver. This active buildup of a brake pressure allows for forceful braking of wheels 16a and 16b developed in particular as rear wheels, without the vehicle beginning to skid.

Continuously adjustable valve 106 may be configured as a valve that is open when no current is supplied. This allows for a pressure equalization in the third brake circuit in the event of significant temperature changes.

First pump 54a and/or second pump 54b may be a single-piston pump. In this case, a development of third pump 104 as a three-piston pump is advantageous. It should be noted, however, that other pumps having one or multiple pistons, asymmetric pumps and/or gear pumps may also be used as pumps 54a, 54b and 104. Pumps 54a, 54b and 104 may be situated on a common shaft 144 of a motor 146. In this manner, an additional motor for operating pumps 54a, 54b and 104 may be omitted.

Using first wheel inlet valve 36a, it is possible to control not only a brake medium displacement from first switchover valve 30a to first wheel brake cylinder 42a, but also from a delivery side of first pump 54a to first wheel brake cylinder 42a. (A brake medium displacement from first wheel brake cylinder 42a to an intake side of first pump 54a and/or from first wheel brake cylinder 42a to first storage chamber 60a is also controllable using first wheel outlet valve 50a.) Second wheel inlet valve 36b and second wheel outlet valve 50b may also be used accordingly. Valves 36a, 36b, 50a and 50b thus allow for a power pressure buildup in associated wheel brake cylinders 42a and 42b in a wheel-specific manner in spite of the joint operation of pumps 54a and 54b.

Accordingly, in spite of a joint co-operation of third pump 104, an undesired pressure change in third wheel brake cylinder 102a and/or in fourth wheel brake cylinder 102b is preventable using valves 106, 116a, 116b, 132a and 132b. Likewise, while keeping the first hydraulic braking torque and/or the second hydraulic braking torque constant, a third hydraulic braking torque of third wheel brake cylinder 102a and a fourth hydraulic braking torque of fourth wheel brake cylinder 102b may be set in a wheel-specific and active manner. For this purpose, third pump 104 and continuously adjustable valve 106 are activated in accordance with the desired third hydraulic braking torque and/or fourth hydraulic braking torque. Although in an operation of third pump 104, first pump 54a and second pump 54b are also operated, it is possible to prevent an undesired volume delivery from brake medium reservoir 20 into brake circuits 10a and 10b in a simple manner by closing block valve 90. Thus, if desired, no additional hydraulic braking torque is built up on wheels 12a and 12b in spite of the fact that pumps 54a and 54b are operated along.

To reduce the third hydraulic braking torque and/or the fourth hydraulic braking torque, the continuously adjustable valve 106 may be opened in accordance with the diminishing braking request. In the process, a volume flows back via the at least partially open continuously adjustable valve 106 into brake medium reservoir 20.

Below, an advantageous use of the brake system for masking a recuperative braking torque of a generator coupled to an axle of wheels 16a and 16b is described:

For example, in recuperative braking, a known, but not constant generator braking torque acts on the joint axle of wheels 16a and 16b. In addition, the driver's braking request may be ascertained using sensor 28, and corresponding information regarding a preferred total braking torque may be provided to an evaluation device/control device (not shown) of the brake system. Subsequently, taking into account the preferred total braking torque, the generator braking torque and optionally the first hydraulic braking torque and/or the second hydraulic braking torque, a setpoint supplementary braking torque may be determined, which is settable using third wheel brake cylinder 102a and fourth wheel brake cylinder 102b for reliably maintaining the total braking torque. Subsequently, the determined setpoint supplementary braking torque is set as the sum of the third hydraulic braking torque and the fourth hydraulic braking torque using wheel brake cylinders 102a and 102b. For example, setting the third hydraulic braking torque and/or the fourth hydraulic braking torque may occur by a pressure setting via a-P control of continuously adjustable valve 106. Alternatively, a pressure regulation is also possible. For this purpose, a pressure sensor 148 may be coupled on junction point 120.

The masking described in the upper paragraph results in a reliable maintenance of the vehicle deceleration specified by the driver. This masking process is not perceptible for the driver.

The brake system may include a control device (not shown), which is additionally configured to receive a power brake specification provided by a vehicle component, and, after receiving the power brake specification, to control block valve 90 into an at least partially open state and to control first pump 54a and/or second pump 54b by taking into account the power brake specification in such a way that additional brake medium volume may be pumped from brake medium reservoir 20 via the at least partially open block valve 90 into the first wheel brake cylinder 42a and/or another brake medium volume may be pumped from brake medium reservoir 20 via the at least partially open block valve 90 into second wheel brake cylinder 42b. The power brake specification may be provided in particular by a component developed as an automatic speed control device and/or a crash protection device, for example an airbag device and/or a belt tightening device. In this way, an advantageous forceful braking of wheels 12a and 12b, particularly in conjunction with wheels 16a and 16b, may be achieved in certain situations.

The brake system described in the above paragraphs also ensures reliable braking of the associated vehicle on at least three wheels 12a, 12b, 16a or 16b, even after the failure of one of its brake circuits 10a, 10b or 14:

In the event of a functional impairment of first brake circuit 10a or of second brake circuit 10b, a pressure may be increased in the still functioning wheel brake cylinders 42a, 42b, 102a or 102b by operating pumps 54a, 54b and 104 in such a way that the sum of the realized hydraulic braking torques compensates for the functional impairment.

In the event of a functional impairment of third brake circuit 14, for example due to an electrical fault of an associated control, transmission and/or energy supply device, the driver is still able to brake directly into first brake circuit 10a and into second brake circuit lob. In such a situation, an additional pressure may be built up in master brake cylinder 18 using the brake booster. This effects a control of the first hydraulic braking torque and of the second hydraulic braking torque. In particular, such a use of brake booster 24 is able to compensate for the functional impairment of third brake circuit 14 in a targeted manner.

FIG. 2 shows a flow chart of a specific embodiment of the method.

The method is able to be implemented by a brake system, which is equipped with a master brake cylinder, a brake medium reservoir, a first wheel brake cylinder, which is hydraulically connected to the master brake cylinder, a second wheel brake cylinder, which is hydraulically connected to the master brake cylinder, a block valve coupled to the brake medium reservoir, a first pump hydraulically connected to the block valve via a first non-return valve and a second pump hydraulically connected to the block valve via a second non-return valve. The brake system of FIG. 1, for example, may be used to carry out the method. The feasibility of the method, however, is not limited to this brake system.

In a method step S1, a power brake specification provided by a vehicle component is received. Examples of the component usable for this purpose were already listed above.

The block valve is controlled into an at least partially open state in a method step S2. Method step S2, however, may already be performed prior to method step S1. The numbering of method steps S1 and S2 does not define a temporal sequence of steps of the method that would have to be maintained.

In a method step S3, the first pump and/or the second pump are operated in such a way that a first brake medium volume is pumped from the brake medium reservoir via the at least partially open block valve into the first wheel brake cylinder and/or a second brake medium volume is pumped from the brake medium reservoir via the at least partially open block valve into the second wheel brake cylinder. The operation of the first pump and/or the second pump occurs by taking the received power brake specification into account. The received power brake specification is thus implementable using cost-effective components and with comparatively little effort. In particular, in this manner, the vehicle may be braked quickly prior to a possible crash and/or may be operated by an automatic speed control system.

What is claimed is:

1. A brake system for a vehicle, comprising:
   a master brake cylinder;
   a brake medium reservoir;
   a first wheel brake cylinder, which is hydraulically connected to the master brake cylinder so that a first brake medium volume is displaceable from the master brake cylinder into the first wheel brake cylinder;
   a second wheel brake cylinder, which is hydraulically connected to the master brake cylinder so that a second brake medium volume is displaceable from the master brake cylinder into the second wheel brake cylinder;
   a first pump associated with the first wheel brake cylinder and a second pump associated with the second wheel brake cylinder; and
   a block valve coupled to the brake medium reservoir;
   wherein the first pump is hydraulically connected to the block valve via a first non-return valve so that by using the first pump, a third brake medium volume is pumpable through the block valve and the first non-return valve into the first wheel brake cylinder, the block valve being at least partially open, and
   wherein the second pump is hydraulically connected to the block valve via a second non-return valve so that by using the second pump, a fourth brake medium volume is pumpable through the at least partially open block valve and the second non-return valve into the second wheel brake cylinder.

2. The brake system of claim 1, further comprising:
   a third pump coupled to the brake medium reservoir;
   at least one third wheel brake cylinder, which is hydraulically connected to the third pump so that a seventh brake medium volume may be pumped by the third pump from the brake medium reservoir into the third wheel brake cylinder; and
   a continuously adjustable valve, which is hydraulically connected to the brake medium reservoir and at least the third wheel brake cylinder so that an eighth brake medium volume is displaceable through the at least partially open continuously adjustable valve from the third wheel brake cylinder into the brake medium reservoir.

3. The brake system of claim 2, further comprising:
   a generator, by which a generator braking torque is exertable at least on a wheel associated with the third wheel brake cylinder.

4. The brake system of claim 1, wherein at least one of the following is satisfied: (i) the first non-return valve is oriented so that a brake medium displacement from the first pump to the block valve is prevented by the first non-return valve, and (ii) the second non-return valve is oriented so that a brake medium displacement from the second pump to the block valve is prevented by the second non-return valve.

5. The brake system of claim 1, wherein at least one of the following is satisfied: (i) a first storage chamber of the brake system is hydraulically connected to the first wheel brake cylinder so that a fifth brake medium volume is displaceable from the first wheel brake cylinder into the first storage chamber, and (ii) a second storage chamber of the brake system is hydraulically connected to the second wheel brake cylinder so that a sixth brake medium volume is displaceable from the second wheel brake cylinder into the second storage chamber.

6. The brake system of claim 1, wherein a first switchover valve is situated between the master brake cylinder and the first wheel brake cylinder so that the first brake medium volume is displaceable from the master brake cylinder through the switchover valve into the first wheel brake cylinder, the switchover valve being at least partially open, and a brake medium displacement at least one of from the first switchover valve to the first wheel brake cylinder and from a delivery side of the first pump to the first wheel brake cylinder is controllable by a first wheel inlet valve of the brake system.

7. The brake system of claim 1, wherein a brake medium displacement at least one of from the first wheel brake cylinder to an intake side of first pump and from first wheel brake cylinder to first storage chamber is controllable by a first wheel outlet valve of the brake system.

8. The brake system of claim 1, wherein at least one of the first pump, the second pump, and the third pump is situated on a common shaft of a motor.

9. The brake system of claim 1, wherein there are exactly twelve controllable valves, which are controllable at least into an open state and into a closed state via an electrical signal provided by a control device of the brake system.

10. The brake system of claim 1, wherein the control device is configured to receive a power brake specification provided by a vehicle component, and, after receiving the power brake specification, to control the block valve into an at least partially open state and to control at least one of the first pump and the second pump by taking into account the power brake specification so that the third brake medium volume is pumpable from the brake medium reservoir via the at least partially open block valve into the first wheel brake cylinder and/or the fourth brake medium volume is pumpable from the brake medium reservoir via the at least partially open block valve into the second wheel brake cylinder.

11. A vehicle, comprising:
    a brake system, including:
       a master brake cylinder;
       a brake medium reservoir;
       a first wheel brake cylinder, which is hydraulically connected to the master brake cylinder so that a first brake medium volume is displaceable from the master brake cylinder into the first wheel brake cylinder;
       a second wheel brake cylinder, which is hydraulically connected to the master brake cylinder so that a second brake medium volume is displaceable from the master brake cylinder into the second wheel brake cylinder;
       a first pump associated with the first wheel brake cylinder and a second pump associated with the second wheel brake cylinder; and
       a block valve coupled to the brake medium reservoir;
       wherein the first pump is hydraulically connected to the block valve via a first non-return valve so that by using the first pump, a third brake medium volume is pumpable through the at least partially open block valve and the first non-return valve into the first wheel brake cylinder, and wherein the second pump is hydraulically connected to the block valve via a second non-return valve so that by using the second pump, a fourth brake medium volume is pumpable through the at least partially open block valve and the second non-return valve into the second wheel brake cylinder.

12. A method for operating a brake system of a vehicle, the method comprising:

receiving, in the brake system, control data in the form of a power brake specification provided by a vehicle component, wherein the brake system includes a master brake cylinder, a brake medium reservoir, a first wheel brake cylinder, which is hydraulically connected to the master brake cylinder, a second wheel brake cylinder, which is hydraulically connected to the master brake cylinder, a block valve coupled to the brake medium reservoir, a first pump hydraulically connected to the block valve via a first non-return valve and a second pump hydraulically connected to the block valve via a second non-return valve;

controlling, according to the received control data, the block valve into an at least partially open state; and operating, according to the received control data, at least one of the first pump and the second pump so that at least one of a first brake medium volume is pumped from the brake medium reservoir via the at least partially open block valve into the first wheel brake cylinder and a second brake medium volume is pumped from the brake medium reservoir via the at least partially open block valve into the second wheel brake cylinder.

* * * * *